Patented May 19, 1953

2,639,275

UNITED STATES PATENT OFFICE 2,639,275

PROCESS AND APPARATUS FOR PREPARING OIL SOLUTIONS OF HIGH MOLECULAR WEIGHT POLYMERS

Herbert H. Vickers, Union Township, Union County, and Stanley E. Jaros, Rahway, N. J., assignors to Standard Oil Development Company, a corporation of Delaware Application July 28, 1950, Serial No. 176,328

11 Claims. (Cl. 260—34.2)

This invention relates to a process for finely dividing high molecular weight polymeric materials and preparing a solution of such materials in a liquid compatible therewith. It also relates to an apparatus for carrying out the process. More particularly the invention relates to a process for the preparation of oil solutions of high molecular weight polymers and to an apparatus for carrying out the process.

It is known to the art that certain high molecular weight polymeric materials, such as polymers and copolymers of substances such as isobutylene, isoprene, butadiene, styrene, and other olefinic materials, both aliphatic and aromatic, have utility in industry for a great many purposes. For example, high molecular weight polyisobutylene in the range of 5,000 to 250,000 Staudinger has been found to be useful as a lubricant additive. Copolymers of isobutylene and butadiene and/or isoprene, known commercially as butyl rubber, also have utility as viscosity improvers and the like.

One major hindrance to more widespread industrial use of these high molecular weight polymeric materials is that they are often difficult to put into solution in oil or other liquid with which they are compatible when of a molecular weight sufficiently high to give the improvement desired, particularly in regard to viscosity improvement. Heretofore it has been the prevailing practice to charge the polymeric material to a kneader and then very gradually add small amounts of the liquid until a mixture of sufficiently low consistency is produced to permit it to be discharged to the main liquid body. It has also been a practice to cut or tear the polymeric material into small particles and agitate them in a hot liquid bath to form a solution, this agitation and heating sometimes taking as long as 24 hours or more until solution is completed. Such procedures are slow, necessarily batchwise, and thus expensive.

This invention has as its object to furnish the art with an improved process for preparing solutions of these high molecular weight polymeric materials in liquids with which they are compatible. A further object is to furnish an apparatus for carrying out the improved process in a continuous manner.

Briefly outlined, this improved process comprises passing the polymeric material through an extruder and into an apparatus equipped with a series of orifice plates, mixing chambers, and screens, the orifices in the progressive plates being diminishing in diameter, each orifice plate, screen bundle, and mixing chamber being so equipped that a heated pressurized liquid compatible with the polymeric material is admixed with the polymer at these stages. The polymeric material being subjected to the shearing action of the extruder, the screens, and the orifice plates, and being admixed intimately with the hot pressurized liquid at these stages, is progressively reduced in particulate size and is dissolved in the liquid present under pressure so that it leaves the apparatus in a jelly-like mass where it may be diluted directly with a further body of the liquid, solution occurring in as short a time as 5 minutes or less. The operation is continuous and is correspondingly economical and efficient.

In the drawing, the figure represents one form of an apparatus suitable for carrying out the process of the instant invention.

Referring now to the drawing, 2 represents chambered annular member such as a spool piece which may be jacketed for a heating media such as steam, hot water, hot oil and the like, as shown at 4. The spool piece is attached to an extruder, shown in portion at 6 which may also be jacketed for heating as shown at 8. The polymeric material to be sub-divided is fed continuously to the extruder through an opening, such as that represented at 10, and is propelled by a worm feeder such as 12 driven by a power source, not shown, through openings 14 in the extruder head 16. The attachment of the spool piece to the extruder may be accomplished by any of the methods known to the art such as flanges, screw arrangements and the like.

From the extruder head openings 14 the extruded polymer passes through a screen bundle 18. The screen bundle in the instant embodiment contains 3 screens of 24, 10 and 10 mesh, respectively. The arrangement of the screens in the screen bundle as described performs two functions. The finer screen is supported by the more coarse screens, which serve as a backing, thus preventing damage to the fine screen. The fluid material compatible with the polymer, which has been heated by heater 20 and pressurized to the desired pressure by multi-discharge pump 22 driven by power source 24, is introduced on the rear face of the screen bundle 18 through line 26. The coarse screens at the rear of screen bundle 18 thus serve as dividers or distributors for the pressurized liquid stream passing through the screen bundle in a direction initially opposite to the movement of the polymer which is at the instant in subdivided form due to pas-

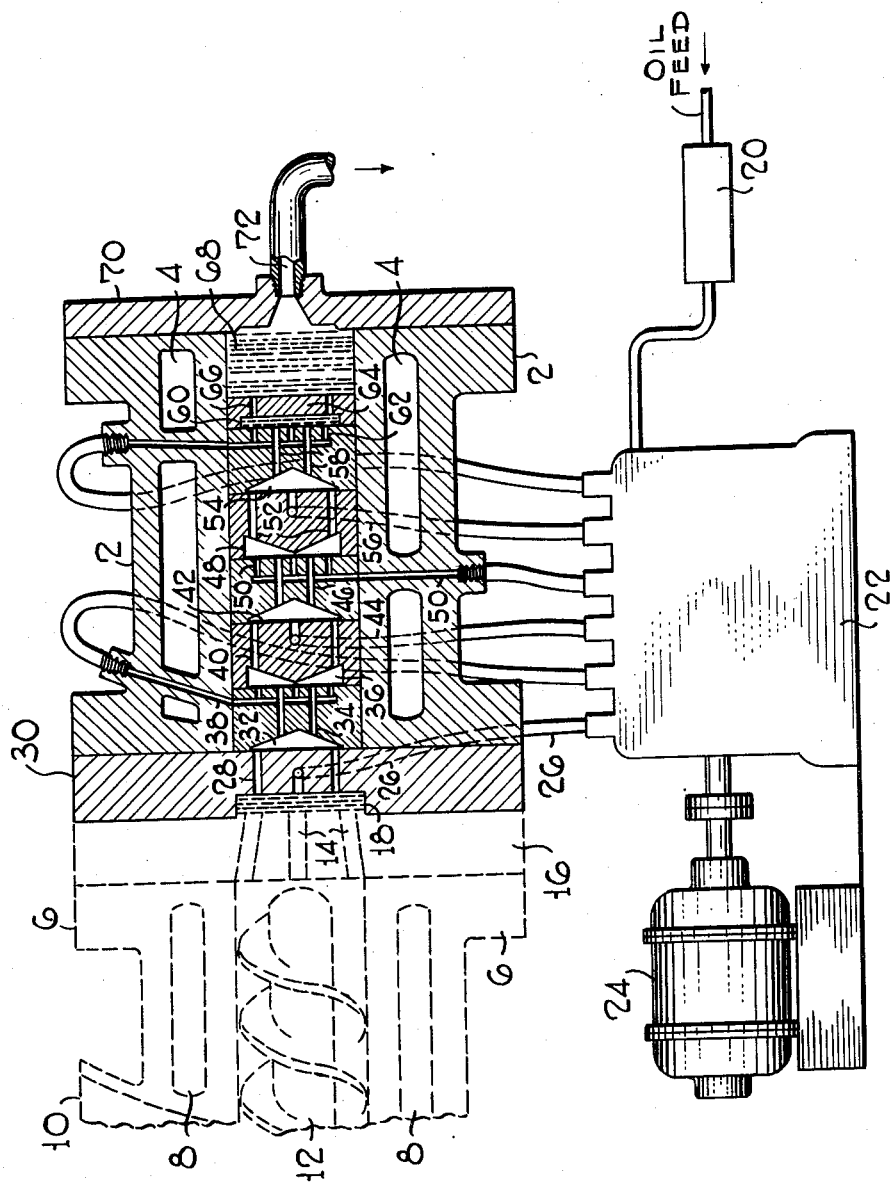

lar weight polyisobutylene in oil and in preparing solutions of high molecular weight copolymers of isobutylene and butadiene and/or isoprene in oil. By the term high molecular weight, reference is made to Staudinger molecular weights ranging from about 5,000 to 250,000 or even higher. Using these particular copolymers, oils having a viscosity ranging from about 10 to about 1,000 S. U. S. at 210° F. are useful, the oils being either naturally occurring petroleum products or synthetically manufactured oils.

The temperature at which the extruder and the spool piece is maintained will depend upon the solution being prepared. When dissolving butyl rubber in oil for instance, it may well be maintained at a range of from 250° F. to 350° F.

The pressure of the oil and the temperature to which it is heated will also vary with the materials being used. In addition the pressure required will depend on the pressure drop of the polymer-oil mixture through the apparatus and will depend on viscosity of polymer and oil, number of mixing stages, size of orifices, screen mesh, the rate of throughput, and the like. In the case of butyl rubber having a Mooney viscosity of from 30–40, for example, and oil, pressures of from 500 to 3,000 p. s. i. g. may be used and the oil heated to from 250° F. to 350° F.

What is claimed is:

1. A process for the preparation of solutions of high molecular weight polymeric materials in liquids capable of dissolving them which comprises extruding the polymeric material, passing the extruded polymer through a series of screens, admixing hot pressurized liquid with the screened polymeric material, passing the mixture of polymeric material and liquid through orifices and into a conical-shaped mixing and converging zone, passing the mixture of polymeric material and liquid through second orifices smaller in size than and misaligned axially with the first mentioned orifices, admixing additional hot pressurized liquid with the mass and diverging the flow for mixing and passing through additional misaligned orifices and repeating these operations until the mixture of polymeric material and liquid is substantially a solution.

2. A process for the preparation of solutions of high molecular weight polymeric materials in liquids capable of dissolving them which comprises extruding the polymeric material, passing the extruded polymer through a series of screens, admixing hot pressurized solvent liquid with the polymeric material on the rear face of said screens, passing the mixture of liquid and polymeric material through an orifice and into a conical-shaped mixing and converging chamber, passing the mixture through a second and smaller and axially misaligned orifice into a second conical-shaped mixing and diverging chamber and adding additional hot pressurized liquid thereto, thereafter passing the mixture into a third and still smaller orifice and into a third conical-shaped mixing chamber and continuing the operation through progressively smaller orifices and through successively converging and diverging conical-shaped mixing chambers, with introduction of hot solvent liquid at each mixing chamber, thereafter passing said mixture through a series of screens and admixing hot pressurized liquid therewith, passing the mixture through a distribution plate and recovering therefrom a substantial solution of polymeric material in the liquid.

3. A process according to claim 1 wherein the high molecular weight polymeric material is a high molecular weight copolymer of isobutylene and isoprene and the liquid is an oil having a viscosity ranging from about 10 to about 1,000 S. U. S. at 210° F.

4. A process according to claim 1 wherein the high molecular weight polymeric material is a polyisobutylene having a Staudinger molecular weight ranging from about 5,000 to 250,000 and wherein the liquid is an oil having a viscosity ranging from about 10 to about 1,000 S. U. S. at about 210° F.

5. An apparatus suitable for preparing solutions of high molecular weight materials in liquids capable of dissolving them which comprises an axially chambered annular member adapted to be attached to an extruder head, a series of screen bundle and pressure plates contained in axial alignment therein, said pressure plates containing consecutively axially misaligned orifices opening from mixing chambers including conical elements designed to cause lateral flow of material to succeeding pressure plate orifices.

6. An apparatus suitable for preparing solutions of high molecular weight materials in liquids capable of dissolving them which comprises an axially chambered annular member adapted to be attached to an extruder head, said annular member containing therein a series of circular screen bundles and a series of circular orifice plates held in fixed relationship, said screen bundles being composed of screens of varying mesh size arranged so that a fine screen is preceded and followed by a coarser screen, said at least one of said orifice plates containing in the feed face thereof a substantially conical faced recess to cause flow of materials entering it to converge and containing orifices opening from said recesses, said annular member being equipped with means for injecting liquids at high temperature at high pressure into each orifice place recess.

7. A combination according to claim 10 wherein said screens precede said plates.

8. A combination according to claim 10 wherein said screen follow said plates.

9. A combination according to claim 10 wherein said screens both precede and follow said plates.

10. In an apparatus for preparing a solution in solvent liquid of plastic rubbery material and the like, the combination which comprises a body member with an annular axial passageway therethrough, a series of axially aligned orifice plates having axially misaligned openings therethrough, alternate plates being provided respectively with conical recesses and conical protuberances on the advance face thereof to cause alternate convergence and divergence of flow, means for injecting said solvent liquid laterally into said annular passageway, a series of alternately fine meshed and coarse meshed screens, and means for forcing said material through said plates and screens.

11. In an apparatus of the character described, a mixing device comprising a body member with an axial passageway of circular cross-section therethrough, a series of foraminate members substantially filling said passageway, said series comprising annular screen bundles and annular orifice plates, at least one of said orifice plates containing a substantially conical recess in the feed face thereof to cause flow to converge and at least one adjoining orifice plate having a conical protrusion on the feed face thereof to cause flow to diverge, said orifice plates being provided with orifices respectively in axial misalignment to cause extended material to flow transversely between said plates and means for introducing a plasticizing fluid between said plates.

HERBERT H. VICKERS.
STANLEY E. JAROS.

References Cited in the file of this patent

UNITED STATES PATENTS

| Number | Name | Date |
|---|---|---|
| 642,813 | Cowen | Feb. 6, 1900 |
| 2,178,955 | Draemann | Nov. 7, 1939 |
| 2,291,212 | Clinefelter | July 29, 1942 |
| 2,312,639 | Gronemeyer | Mar. 2, 1943 |